United States Patent
Kim

(10) Patent No.: US 12,187,188 B2
(45) Date of Patent: Jan. 7, 2025

(54) VEHICLE AND CONTROL METHOD THEREOF

(71) Applicants: HYUNDAI MOTOR COMPANY, Seoul (KR); KIA CORPORATION, Seoul (KR)

(72) Inventor: Donghyuk Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 208 days.

(21) Appl. No.: 18/092,488

(22) Filed: Jan. 3, 2023

(65) Prior Publication Data
US 2023/0146510 A1  May 11, 2023

Related U.S. Application Data

(62) Division of application No. 17/238,744, filed on Apr. 23, 2021, now Pat. No. 11,572,012.

(30) Foreign Application Priority Data

Sep. 16, 2020 (KR) ........................ 10-2020-0119017

(51) Int. Cl.
*B60W 30/08* (2012.01)
*B60Q 1/08* (2006.01)
*B60Q 1/24* (2006.01)
*G06V 20/56* (2022.01)

(52) U.S. Cl.
CPC ............... *B60Q 1/24* (2013.01); *B60Q 1/085* (2013.01); *B60W 30/08* (2013.01); *G06V 20/56* (2022.01); *B60W 2552/53* (2020.02)

(58) Field of Classification Search
CPC .......... B60Q 1/24; B60Q 1/085; G06V 20/56; B60W 30/08; B60W 2552/53
See application file for complete search history.

(56) References Cited

FOREIGN PATENT DOCUMENTS

KR    10-2019-0140499 A    12/2019

*Primary Examiner* — Mathew Franklin Gordon
(74) *Attorney, Agent, or Firm* — Morgan, Lewis & Bockius LLP

(57) ABSTRACT

A vehicle may include: a camera configured to obtain a surrounding image of the vehicle; and a controller configured to derive spatial recognition data by learning the surrounding image of the vehicle as an input value, derive object recognition data including wheel area data of surrounding vehicles by learning the surrounding image of the vehicle as an input value, determine a ground clearance between a bottom surface of a vehicle body of the surrounding vehicle and a ground by use of the spatial recognition data and the wheel area data, and control the vehicle to park the vehicle by reflecting the ground clearance.

11 Claims, 8 Drawing Sheets

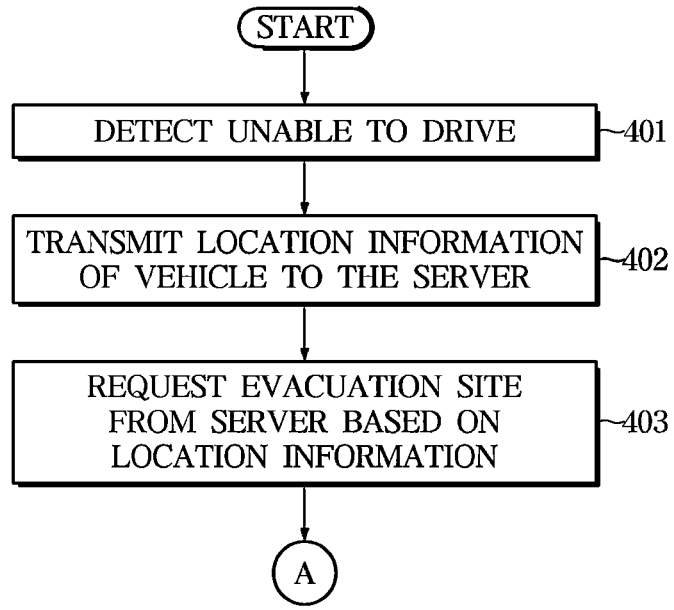
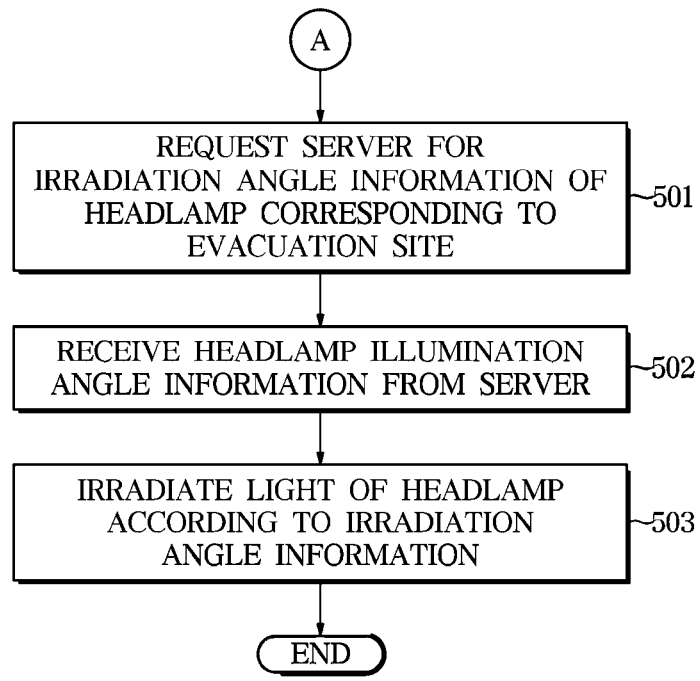

VEHICLE AND CONTROL METHOD THEREOF

CROSS-REFERENCE TO RELATED APPLICATION

The present application claims priority to Korean Patent Application No. 10-2020-0119017, filed on Sep. 16, 2020 in the Korean Intellectual Property Office, the entire contents of which is incorporated herein for all purposes by this reference.

BACKGROUND OF THE INVENTION

Field of the Invention

The present invention relates to a vehicle and a control method thereof, and more particularly, to a vehicle and a control method for controlling headlamps of a plurality of vehicles in an emergency situation.

Description of Related Art

Headlamps of recently mass-produced vehicles are disposed with an adaptive headlamp function that controls the irradiation direction according to steering or the like, in addition to irradiating light only in the direction of vehicle travel.

Accordingly, the headlamp of the vehicle may irradiate light in various directions in a stopped state in addition to the driving state.

In an emergency situation in a tunnel or dark section, it is necessary to use the above-described headlamps to escape the occupants. Furthermore, since various infrastructures for controlling headlamps are built in the vehicle, it is possible to prevent secondary accidents in emergency situations.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle for controlling a headlamp and a control method thereof to provide a safe evacuation route for an occupant in an emergency situation.

In accordance with various exemplary embodiments of the present invention, a vehicle includes: a headlamp configured to irradiate light to the front of the vehicle; a communication configured to perform wireless communication with a server; and a controller configured to control, when detecting an emergency situation, the communication to transmit location information related to the vehicle to the server, receive first irradiation angle information related to the headlamp corresponding to an evacuation site in a response to a request to the server for an evacuation site based on the location information, and control the head lamp based on the first irradiation angle information.

The controller may be configured to control the communication so that the server transmits location information of the evacuation site to a plurality of other vehicles in the vicinity of the vehicle and so that the server transmits second irradiation angle information related to a plurality of other vehicles corresponding to the evacuation site to the plurality of other vehicles.

The controller may be configured to control the communication to receive position information related to a plurality of other vehicles around the vehicle, and generate second irradiation angle information related to headlamps of the plurality of other vehicles based on the evacuation site and the location information related to the plurality of other vehicles, and transmit the second irradiation angle information to the plurality of other vehicles.

When the evacuation site is in front of the vehicle, the controller may be configured to control the headlamp so that light from the headlamp is directed toward the evacuation site.

When the evacuation site is the rear of the vehicle, the controller may be configured to control the headlamp so that the light of the headlamp is irradiated to the right of the vehicle when the vehicle is located in the last lane so that the light of the headlamp is irradiated to the left of the vehicle when the vehicle is located in the first lane.

When the evacuation site is in a rear of the vehicle, the controller may be configured to control the headlamp so that light from the headlamp is not irradiated when the location of the vehicle does not correspond to the first lane and a last lane of the road.

The controller may be configured to control the headlamp so that light from the headlamp is irradiated to a front of the vehicle when the vehicle is located in a tunnel, and a degree of entry of the vehicle is longer than a remaining section of the tunnel, and control the headlamp so that the light of the headlamp is irradiated to the left or the right of the vehicle when the degree of entry of the vehicle is shorter than the remaining section.

The controller may be configured to receive a position of an emergency exit of the tunnel from the server, and control the headlamp so that light from the headlamp is directed to the emergency exit.

The controller may be configured to control the headlamp so that the light of the headlamp is directed toward a position of the emergency exit when the emergency exit is in front of the vehicle, and may control the headlamp so that the light from the headlamp is directed toward a wall of the tunnel when the emergency exit is behind the vehicle.

The controller may be configured to control the communication so that the server transmits location information of the evacuation site to a plurality of other vehicles around the vehicle, and the capacity of the battery of the plurality of other vehicles may be higher than a predetermined level.

In accordance with various exemplary embodiments of the present invention, a control method of a vehicle including a headlamp in which a direction of light irradiation is adjusted: transmitting location information related to the vehicle to a server when an emergency situation is detected: receiving first irradiation angle information related to a headlamp corresponding to the evacuation site in a response to a request to the server for an evacuation site based on the location information related to the vehicle; and controlling the head lamp based on the first irradiation angle information.

The receiving first irradiation angle information may include controlling the communication so that the server transmits location information of the evacuation site to a plurality of other vehicles in the vicinity of the vehicle, and so that the server transmits second irradiation angle information related to a plurality of other vehicles corresponding to the evacuation site to the plurality of other vehicles.

The receiving of the first irradiation angle information may include controlling the communication to receive location information related to a plurality of other vehicles around the vehicle, and generating second irradiation angle information related to headlamps of the plurality of other vehicles based on the evacuation site and the location information related to the plurality of other vehicles, and transmitting the second irradiation angle information to the plurality of other vehicles.

The controlling the headlamp may include controlling the headlamp so that the light from the headlamp is directed toward the evacuation site when the evacuation site is in front of the vehicle.

The controlling of the headlamp may include, when the evacuation site is at the rear of the vehicle, controlling the headlamp so that light of the lamp is irradiated to the left of the vehicle when the vehicle is located in the first lane, and controlling the headlamp so that the light of the headlamp is irradiated to the right of the vehicle when the vehicle is located in a last lane of the road.

The controlling of the headlamp may include, when the evacuation site is at the rear of the vehicle, controlling the headlamp so that light from the headlamp is not irradiated when a position of the vehicle does not correspond to the first lane and a last lane of the road.

The controlling of the headlamp may include controlling the headlamp so that the light of the headlamp is irradiated to the front of the vehicle when the vehicle is positioned in a tunnel and a degree of entry of the vehicle is longer than a remaining section of the tunnel, and controlling the headlamp so that the light of the headlamp is irradiated to the left or the right of the vehicle when the degree of entry of the vehicle is shorter than the remaining section.

The controlling of the headlamp may include controlling to receive a position of an emergency exit of the tunnel from the server, and controlling the headlamp so that light from the headlamp is directed toward the emergency exit.

The controlling of the headlamp may include controlling the headlamp so that the light of the headlamp is directed toward a position of the emergency exit when the emergency exit is in front of the vehicle, and controlling the headlamp so that the light of the headlamp is directed toward a wall of the tunnel when the emergency exit is a rear of the vehicle.

In accordance with various exemplary embodiments of the present invention, the computer program is stored in a recording medium to execute the following steps: transmitting location information related to the vehicle to a server when an emergency situation is detected by combining with a computing device: receiving first irradiation angle information related to a headlamp corresponding to the evacuation site in a response to requesting the server for an evacuation site based on the location information related to the vehicle; and controlling the head lamp based on the first irradiation angle information.

In accordance with an aspect of the present invention, it is possible to prevent a secondary accident which may occur in the future by controlling the head lamp to provide a safe evacuation route for the occupant in an emergency situation.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4, FIG. 5 and FIG. 6 are flowcharts illustrating a control method of a vehicle according to various exemplary embodiments of the present invention.

Figure 1:
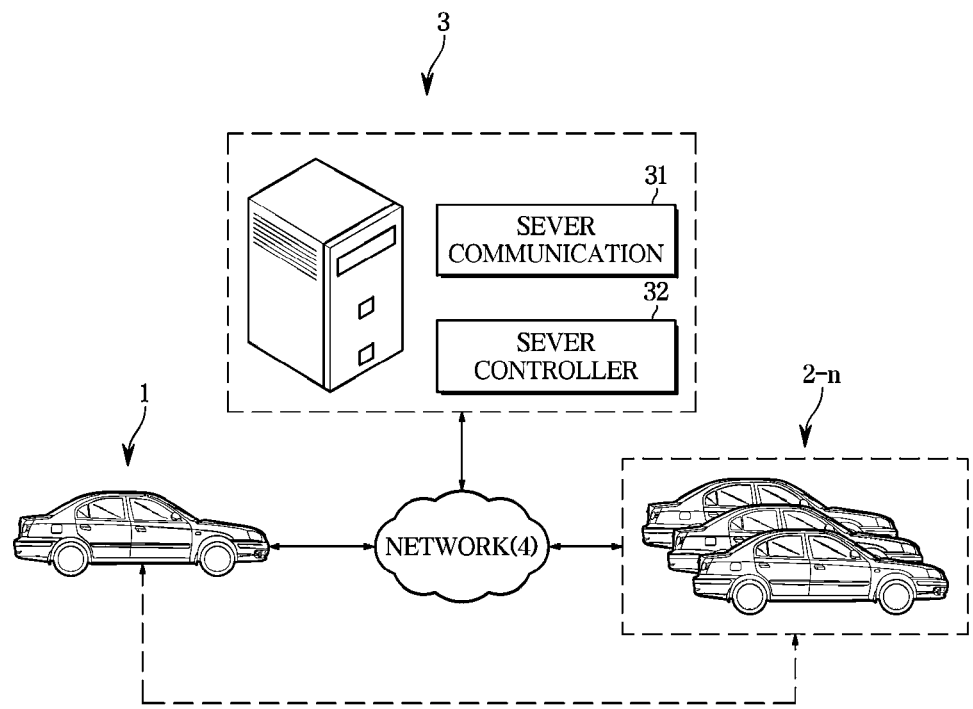
FIG. 1 illustrates a system in which a vehicle and a server are implemented according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Like numerals refer to like elements throughout the specification. Not all elements of embodiments of the present invention will be described, and description of what are commonly known in the art or what overlap each other in the exemplary embodiments will be omitted. The terms as used throughout the specification, such as "~ part", "~ module", "~ member", "~ block", etc., may be implemented in software or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

It will be further understood that the terms "comprises" and/or "comprising." when used in the present specification, identify the presence of stated features, integers, steps, operations, elements, and/or components, but do not preclude the presence or addition of one or more other features, integers, steps, operations, elements, components, and/or groups thereof, unless the context clearly indicates otherwise.

In the specification, it will be understood that, when a member is referred to as being "on/under" another member, it may be directly on/under the other member, or one or more intervening members may also be present.

The terms including ordinal numbers like "first" and "second" may be used to explain various components, but the components are not limited by the terms. The terms are only for distinguishing a component from another.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present invention will be described with reference to the accompanying drawings.

Figure 2:
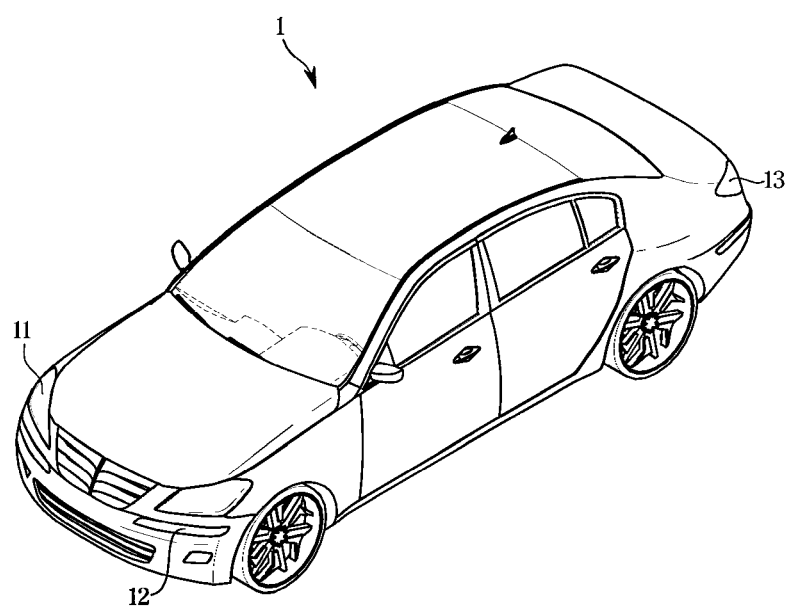
FIG. 2 is a block diagram of a vehicle according to various exemplary embodiments of the present invention.
Figure 3:
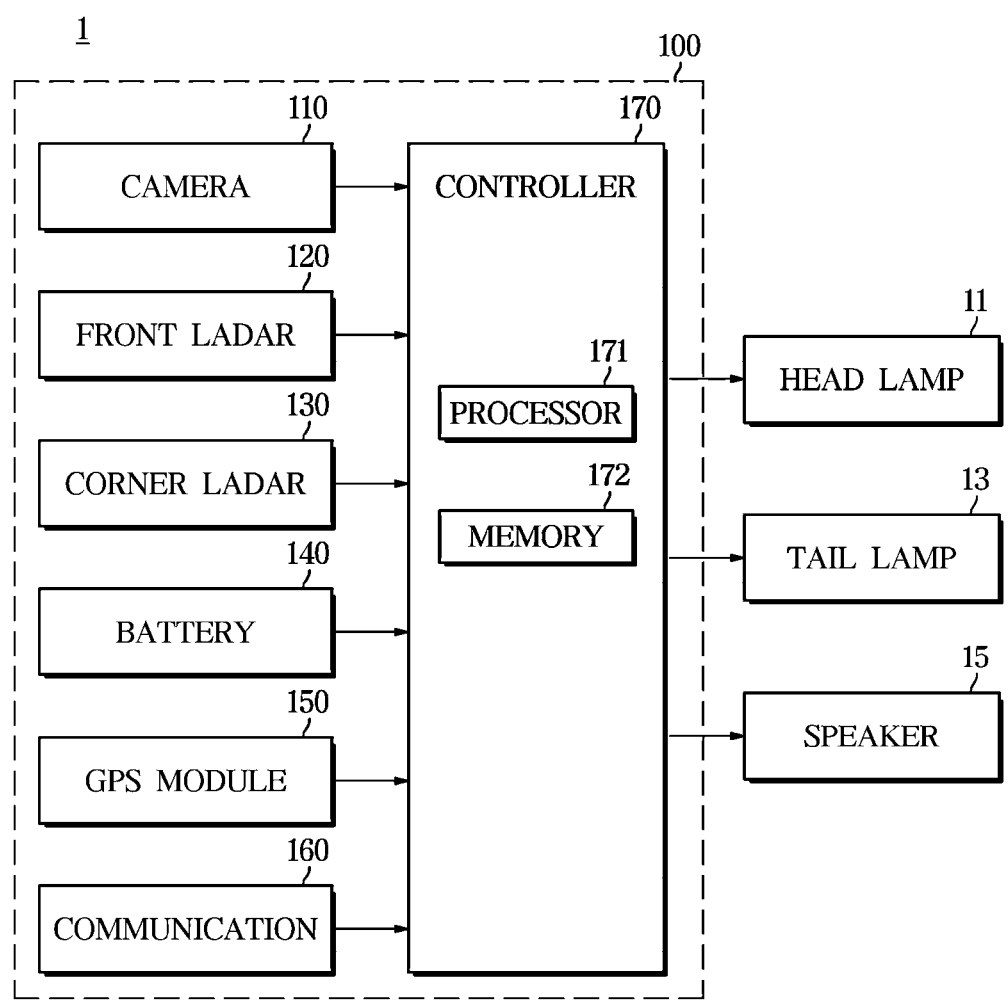
FIG. 3 is a control block diagram of a vehicle according to various exemplary embodiments of the present invention.

FIG. 1 illustrates a system in which a vehicle and a server are implemented according to various exemplary embodiments of the present invention, FIG. 2 is a block diagram of a vehicle according to various exemplary embodiments of the present invention, and FIG. 3 is a control block diagram of a vehicle according to various exemplary embodiments of the present invention.

The present invention is to guide the occupants to an evacuation site by controlling the light irradiated by the headlamps of a plurality of vehicles when an emergency situation occurs in a special road such as a tunnel or a bridge. For example, a tunnel is a closed space where external light is not supplied, and it is necessary to secure the occupant's view through a headlamp.

According to the system shown in FIG. 1, it includes the vehicle 1 for controlling the headlamp by receiving the evacuation site from the server 3 through the network 4 and a plurality of different vehicles 2-n receiving irradiation angle information for controlling the headlamps from the vehicle 1. As described above, the plurality of other vehicles 2-n may receive the irradiation angle information from the vehicle 1 and may directly receive the irradiation angle information from the server 3.

The server 3 may include a server communication 31 and a server controller 32, the server communication 31 may perform wireless communication with the vehicle 1 and a plurality of other vehicles 2-n, and the server controller 32 may transmit a control signal to the vehicle 1 and a plurality of other vehicles 2-n based on information transmitted and received by the server communication unit 31.

Referring to FIG. 2, the vehicle 1 is provided with a headlamp 11 for irradiating light in the traveling direction of the vehicle 1 in the forward direction thereof. In the instant case, the headlamp 11 may control the direction of irradiated light by adjusting it up, down, left and right according to the movement of the steering wheel, the speed of the vehicle, and the slope of the vehicle.

Furthermore, a turn signal lamp 12 may be provided at the front and rear of the vehicle 1 to indicate the direction of the vehicle 1.

Furthermore, a tail lamp 13 is provided at the rear of the vehicle 1 to display a gear shifting state and a brake operation state of the vehicle 1.

The configuration of the vehicle 1 described with reference to FIG. 2 may also be applied to a plurality of other vehicles 2-n that receive control signals from the vehicle 1 or the server 3.

A vehicle 1 according to various exemplary embodiments of the present invention includes a driver assistance system 100, a head lamp 11, a tail lamp 13 and a speaker 15.

The speaker 15 is for outputting sound from an audio unit or a navigation device. For example, broadcast sound or sound source reproduction sound from the audio unit may be output to the speaker 15. Furthermore, a guide comment and a guide sound of the navigation may be output through the speaker 15. Furthermore, the speaker 15 may transmit sound not only inside but also outside by adjusting the volume.

The driver assistance system 100 may include a camera 110, a front radar 120, a plurality of corner radars 130, a battery 140, a Global Positioning System (GPS) module 150, and a communication 160.

The camera 110 may include a front camera for securing a field of view toward the front of the vehicle 1 and a lateral camera for securing a field of view toward the side of the vehicle 1.

The front camera may be provided on the front windshield of the vehicle 1. The front camera may photograph the front of the vehicle 1 and acquire image data in front of the vehicle 1. The image data in front of the vehicle 1 may include location information on at least one of other vehicles, pedestrians, cyclists, lanes, curbs, guardrails, street trees, and street lights located in front of the vehicle 1.

The camera 110 may detect the occurrence of an accident by capturing the movement of another vehicle located in front. The camera 110 may provide image data to the controller 170, and the controller 170 may process the image data to determine that an accident has occurred and that the vehicle may not be driven when the motion of another vehicle positioned in front is not detected for a predetermined time period or longer.

The camera 110 may include a plurality of lenses and an image sensor. The camera 110 may transmit the external field of view image data of the vehicle 1 to the controller 170.

The front radar 120 may have a field of detecting facing the front of the first vehicle 1. The front radar 120 may be provided, for example, on a grille or bumper of the vehicle 1.

The front radar 120 may include a transmitting antenna (or a transmitting antenna array) that radiates a transmission wave toward the front of the first vehicle 1, and a receiving antenna (or a receiving antenna array) that receives a reflected wave reflected from an obstacle.

The front radar 120 may obtain front radar data from a transmission wave transmitted by a transmitting antenna and a reflected wave received by a receiving antenna.

The front radar data may include location information and speed levels of other vehicles or pedestrians or cyclists located in front of the vehicle 1.

The front radar 120 may determine the relative distance to the obstacle based on the phase difference (or time difference) between the transmitted wave and the reflected wave, and determine the relative speed of the obstacle based on the frequency difference between the transmitted wave and the reflected wave.

The plurality of corner radars 130 may include a first corner radar provided on the front right side of the vehicle 1, a second corner radar provided on the front left side of the vehicle 1, a third corner radar provided on the rear right side of the vehicle 1 and a fourth corner radar provided on the rear left side of the vehicle 1.

The first corner radar may have a detection field of view directed to the front right side of the vehicle 1. The first corner radar may be provided on the right side of the front bumper of the vehicle 1.

The second corner radar may have a sensing field of view toward the front left of the vehicle 1 and may be provided on the left side of the front bumper of the vehicle 1.

The third corner radar may have a detection field of view directed to the rear right side of the vehicle 1 and may be provided on the right side of the rear bumper of the vehicle 1.

The fourth corner radar may have a sensing field of view toward the rear left of the vehicle 1 and may be provided on the left side of the rear bumper of the vehicle 1.

Each of the first, second, third and fourth corner radars may include a transmitting antenna and a receiving antenna.

The first, second, third, and fourth corner radars may obtain first corner radar data, second corner radar data, third corner radar data, and fourth corner radar data, respectively.

The first corner radar data may include distance information and speed levels of other vehicles, pedestrians, or cyclists located on the front right side of the vehicle 1.

The second corner radar data may include distance information and speed level of an obstacle positioned on the front left of the vehicle 1.

The third and fourth corner radar data may include distance information and speed information related to obstacles located at the rear right of the vehicle 1 and the rear left of the vehicle 1.

The first, second, third and fourth corner radars may transmit first, second, third, and fourth corner radar data to the controller 170, respectively.

That is, the front radar and the corner radar are obstacle detection units, and detect obstacles in the front and left and right sides of the own vehicle, and transmit obstacle information on the detected obstacle to the controller 170. Here, the obstacle information may include position information related to the obstacle, and the position information related to the obstacle may include distance information and direction information related to the obstacle.

The battery 140 supplies power to various electronic components provided in the vehicle 1. Furthermore, the battery 140 supplies power to the head lamp 11 and the tail lamp 13 so that the head lamp 11 and the tail lamp 13 may irradiate light.

The GPS module 150 may detect vehicle location information and time information. The GPS module 150 may detect distance information from a satellite and time information at which the distance information is measured, and then apply a triangulation method to the detected distance information to detect three-dimensional location information according to latitude, longitude and altitude, and provide location information and time information to the controller (170).

The communication 160 may communicate with the server 3 to transmit and receive various types of information. The communication unit 160 may communicate with the server 3 to transmit and receive various types of information.

The communication 160 may receive the location information received by the GPS module 150 and determine a current region based on the location information.

Furthermore, the communication 160 may determine the location of the vehicle 1, determine whether the location of the vehicle 1 is inside the tunnel, and provide the location information to the controller 170.

The communication 160 may include a V2V communication module for wireless communication between vehicles and a V2I communication module for wireless communication between the vehicle and road infrastructure. The communication 160 is not limited thereto, and may further include a Vehicle to Pedestrian (V2P) communication module for communication between a vehicle and a pedestrian, and a Vehicle to Nomadic Devices (V2N) communication module for communication between the vehicle and a personal terminal.

The controller 170 may receive an evacuation site in an emergency situation from the communication 160 and generate a control signal to control the headlamp 11 so that light is irradiated in a direction corresponding to the evacuation site.

The controller 170 may include an image signal processor which is a processor 171 that processes image data of the camera 110 and/or a digital signal processor that processes radar data of the radars 120 and 130 and/or generates a braking signal and/or a micro controller (Micro Controller, MCU).

The controller 170 may obtain location information (distance and direction) and speed information (relative speed) of objects outside the vehicle 1 based on the image data of the camera 110 and/or the front radar data of the front radar 120.

The memory 172 may store a program and/or data for processing image data, a program and/or data for processing radar data, and a program and/or data for the processor 171 to generate a braking signal and/or a warning signal.

The memory 172 may temporarily store image data received from the camera 110 and/or radar data received from the radars 120 and 130, and temporarily memorize the processing result of the image data and/or radar data of the memory 172.

The memory 172 is a nonvolatile memory device such as a cache, read only memory (ROM), programmable ROM (PROM), erasable programmable ROM (EPROM), electrically erasable programmable ROM (EEPROM), and flash memory, or RAM (Random Access Memory), or a storage medium such as a hard disk drive (HDD) or a CD-ROM, but is not limited thereto.

Figure 6:
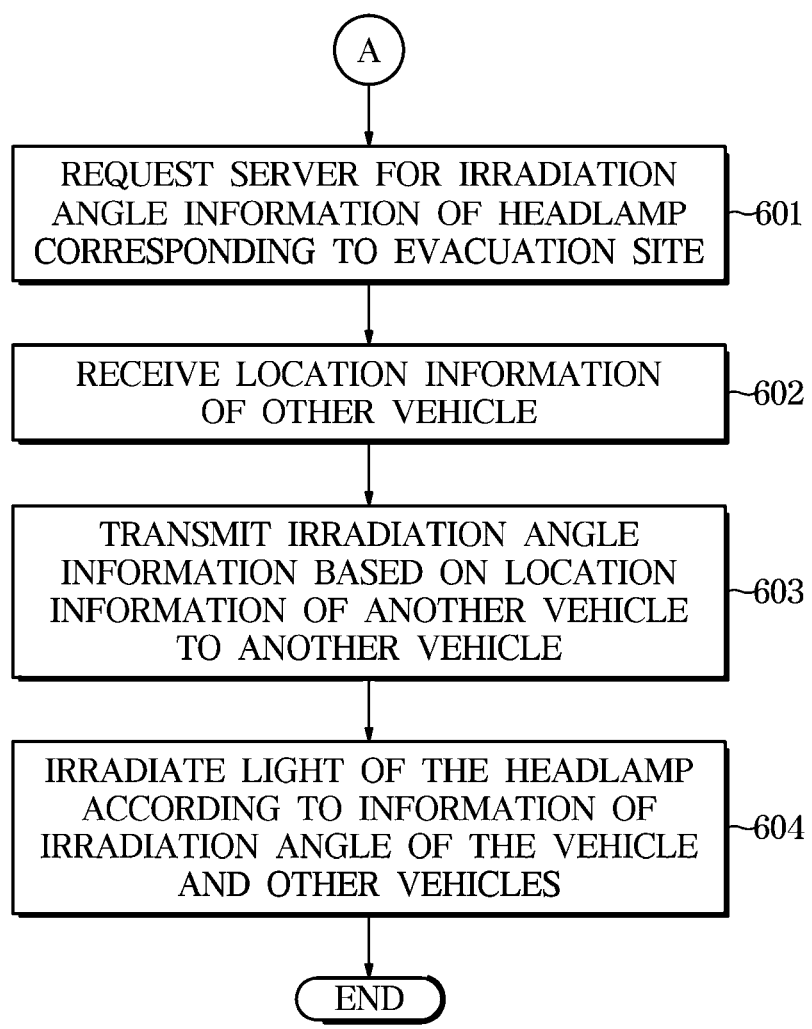

FIG. 4, FIG. 5 and FIG. 6 are flowcharts illustrating a control method of a vehicle according to various exemplary embodiments of the present invention.

It should be noted that the exemplary embodiment described below are assumed to be inside the tunnel, but various exemplary embodiments is not limited inside the tunnel.

For example, embodiments of the present invention may be applied in various emergency situations on dark roads, overpasses and bridges.

First, referring to FIG. 4, the vehicle 1 detects that all of the vehicle 1 and a plurality of other vehicles other than the vehicle 1 are unable to drive, and determines that it is an emergency situation (401).

The vehicle 1 transmits the current location information to the server 3 (402), and requests an evacuation site based on the location information from the server 3 (403). For example, when the vehicle 1 is inside a tunnel, the location information related to the vehicle 1 is transmitted to the server 3 so that the vehicle I may determine where the vehicle 1 is located inside the tunnel. The server 3 may store map information related to the tunnel in which the vehicle 1 is located, so that the nearest evacuation site may be provided according to the location inside the tunnel of the vehicle 1.

On the other hand, the present invention is for providing lighting for emergency escape by controlling the headlamps of a plurality of vehicles in an emergency situation inside a tunnel. To the present end, the present invention may provide irradiation angle information directly to a plurality of vehicles by the server 3, or any one vehicle that has received the irradiation angle information among the plurality of vehicles may provide the irradiation angle information to the remaining vehicles using V2V communication. This will be described in detail with reference to FIG. 5 and FIG. 6.

Referring to FIG. 5, the vehicle 1 requests the server 3 for irradiation angle information related to the headlamp corresponding to the evacuation site (501). In the instant case, the irradiation angle information requested by the vehicle I may request irradiation angle information related to another vehicle located at a different location than the vehicle 1 in addition to the irradiation angle information related to the vehicle 1 transmitting the request signal. When the server 3 receives the request signal from the vehicle 1, it receives each of the location information related to a plurality of other vehicles around the vehicle 1, generates irradiation angle information corresponding to each location information, and transmits each irradiation angle information to a plurality of other vehicles.

The vehicle 1 and a plurality of other vehicles other than the vehicle I receive the irradiation angle information of the headlamp from the server 3 (502), and each vehicle irradiates the light of the headlamp according to the irradiation angle information related to the headlamp from the server 3 (502), and each vehicle irradiates the light of the headlamp according to the irradiation angle information (503).

According to various exemplary embodiments of the present invention, the vehicle 1 may further include a speaker 15, and the speaker 15 may be controlled to provide voice guidance through the speaker 15 of information on an evacuation site. When the vehicle 1 detects an emergency situation, it controls the communication 160 to transmit the location information related to the vehicle 1 to the server 3, and receives information on the evacuation site from the server 3. At the instant time, the controller 170 controls the speaker 15 to provide a voice guide including information on the evacuation site. For example, the voice guidance may include an azimuth angle of an evacuation site based on the front of the vehicle 1, a distance between the vehicle 1 and the evacuation site, and the like.

Furthermore, according to various exemplary embodiments of the present invention, the vehicle 1 may receive first irradiation angle information related to the headlamp corresponding to the evacuation site, control the headlamp based on the first irradiation angle information, and guide an evacuation site through voice guidance and an irradiation direction of light from the headlamp. For example, the vehicle 1 may control the headlamp so that light is irradiated toward the driver (or occupant) exiting the vehicle, and at the same time provide voice guidance regarding the evacuation site.

According to various exemplary embodiments of the present invention, the server 3 may determine a transmission target of the irradiation angle information based on the battery status of the vehicles. This is because it is more efficient to request lighting control from a vehicle with sufficient power than to request lighting control from a vehicle with insufficient battery power. Accordingly, the server 3 may receive information on the capacity of the battery of a plurality of other vehicles within a predetermined radius from the vehicle 1 and transmit irradiation angle information only to vehicles having a predetermined level or higher.

According to various exemplary embodiments of the present invention, the vehicle 1 may control the communication so that the server 3 transmits the evacuation site to a plurality of other vehicles in the vicinity of the vehicle 1, but the plurality of different vehicles may be vehicles having a capacity of a battery equal to or greater than a predetermined level.

Referring to FIG. 6, the vehicle 1 requests the server 3 for irradiation angle information related to the headlamp corresponding to the evacuation site (601).

The vehicle 1 transmits a signal requesting location information to a plurality of other vehicles in the vicinity, and receives location information related to other vehicles (602).

Prior to step 602, the vehicle 1 may request and receive information on the capacity of the battery of a plurality of other vehicles, and may limit a target for requesting location information to provide irradiation angle information only to vehicles having a predetermined level or higher.

The vehicle 1 generates irradiation angle information related to another vehicle based on the irradiation angle information according to its own location and the location information related to another vehicle, and transmits irradiation angle information based on the location information related to the other vehicle to the other vehicle (603). For example, assuming that the light of the headlamp is intensively irradiated to any one on the right based on the driving direction thereof, the irradiation angle of another vehicle in front of the vehicle 1 in the same lane (based on the driving direction) will have a relatively large value. Based on such angular characteristics according to the location, the vehicle 1 may generate irradiation angle information for each location of another vehicle.

The vehicle 1 and a plurality of other vehicles irradiate light of the headlamp according to the irradiation angle information (604).

According to various exemplary embodiments of the present invention, the vehicle 1 may control the communication to receive location information related to a plurality of other vehicles around the vehicle 1, and may generate and transmit irradiation angle information for controlling headlamps of a plurality of other vehicles based on an evacuation site and location information related to a plurality of other vehicles.

Meanwhile, in the above, a process of providing irradiation angle information to a vehicle inside a tunnel has been described with reference to FIG. 4, FIG. 5 and FIG. 6. Hereinafter, lighting formed by headlamps of vehicles that have received irradiation angle information inside a tunnel will be described.

Figure 7:
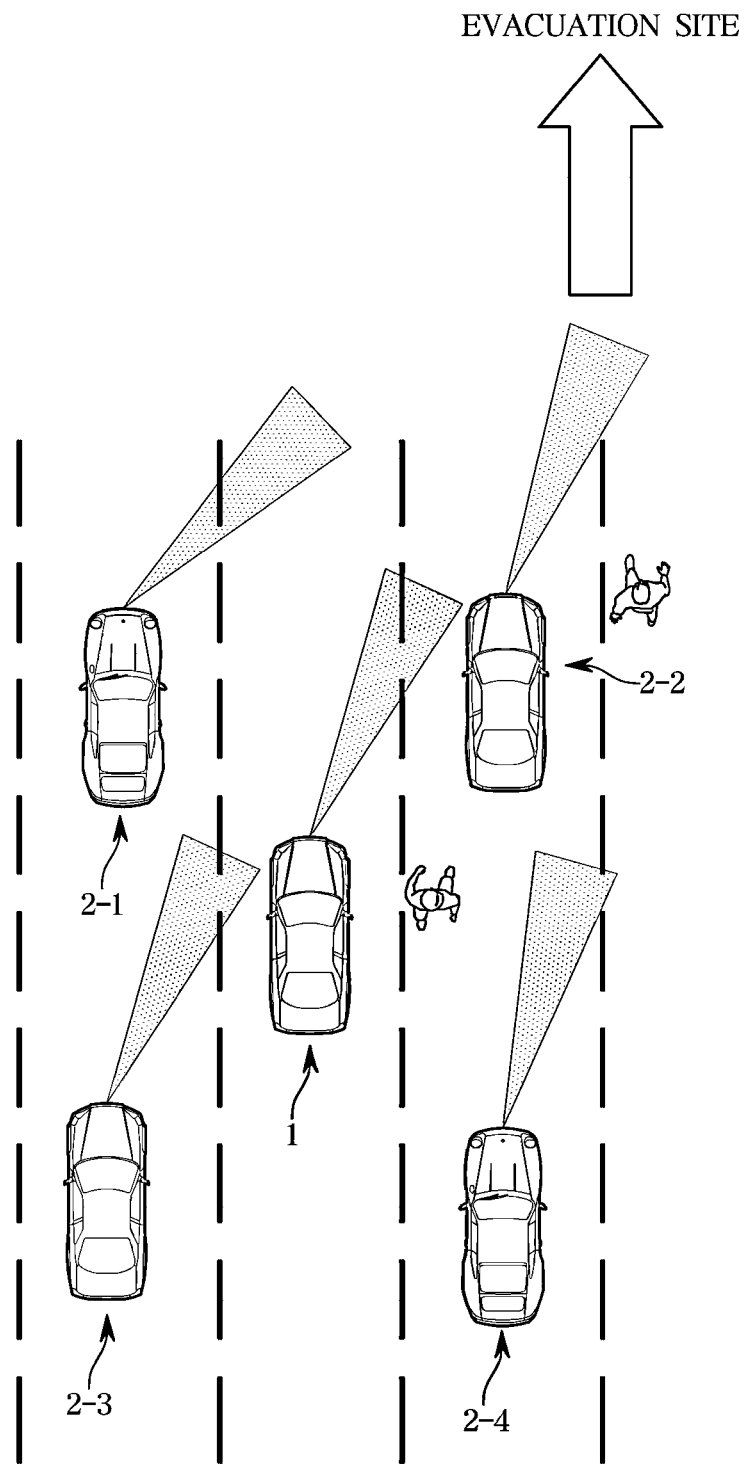
FIG. 7 shows an example of front evacuation in an emergency situation.

FIG. 7 shows an example of front evacuation in an emergency situation.

The vehicle I obtains an evacuation site from the server 3 and controls the irradiation angle of the headlamp toward the evacuation site. At the instant time, a plurality of other vehicles 2-1, 2-2, 2-3, 2-4 other than the vehicle I also control the irradiation angle of the headlamps toward the evacuation site together with the vehicle 1. As a result, all vehicles inside the tunnel are irradiated with light toward the evacuation site, providing a path to the evacuation site to the occupants who got off the vehicle.

According to various exemplary embodiments of the present invention, when the evacuation site is in front of the vehicle 1, the vehicle 1 may control the headlamp so that light from the headlamp is directed toward the evacuation site.

In the instant case, the plurality of other vehicles 2-1, 2-2, 2-3, 2-4 may receive the irradiation angle information from the vehicle 1 or the server 3, and when the evacuation site is in front of the vehicle 1, a plurality of other vehicles 2-1, 2-2, 2-3, 2-4 may also control headlamps so that the light of the headlamp is directed toward the evacuation site.

Figure 8:
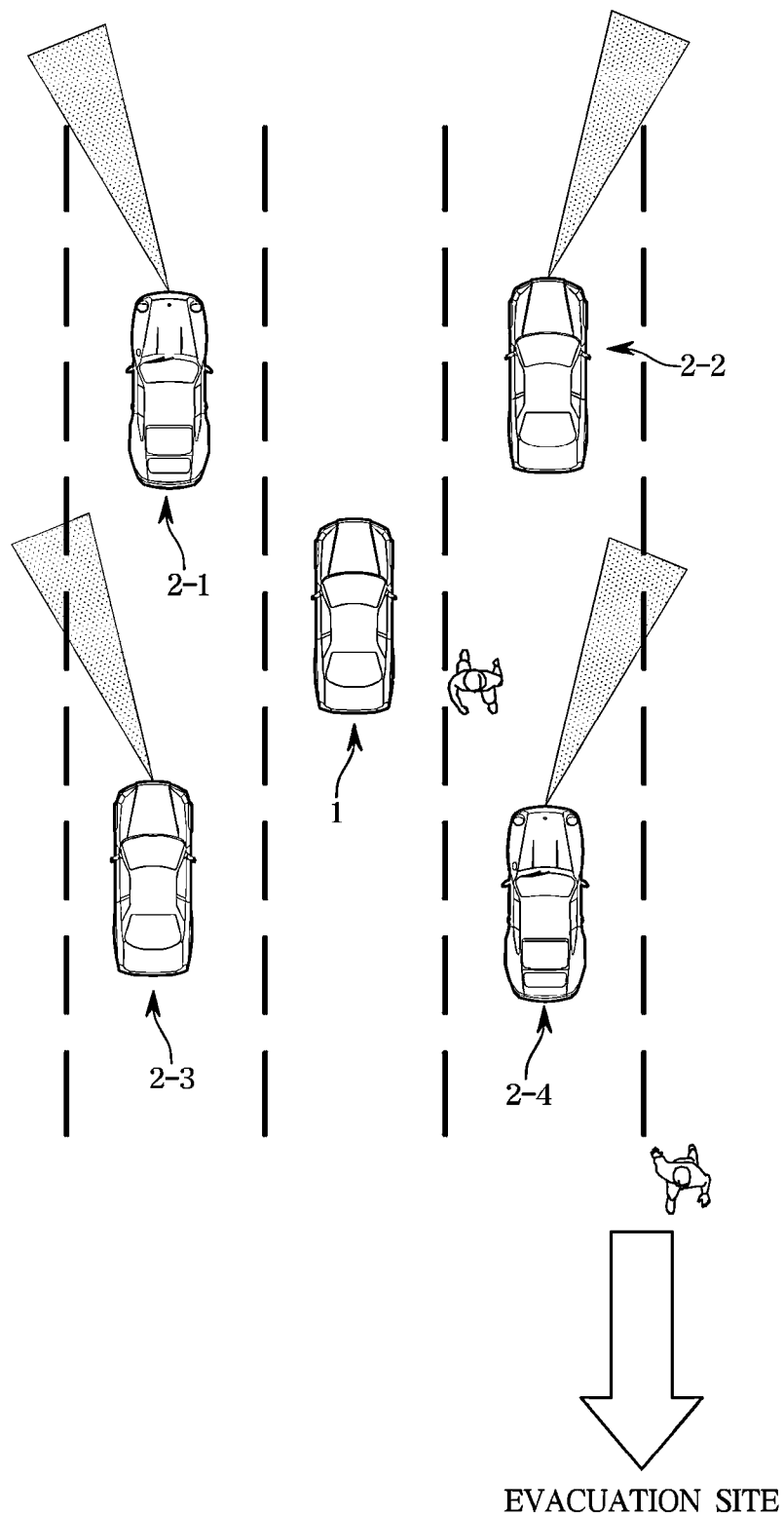
FIG. 8 shows an example of rear evacuation in an emergency situation. 8 shows an example of rear evacuation in an emergency situation.

FIG. 8 shows an example of rear evacuation in an emergency situation.

Unlike the front evacuation, the rear evacuation may irradiate the headlamps of vehicles 2-1, 2-2, 2-3, 2-4 at the last left and last right inside the tunnel to the wall, considering that the light of the headlamp does not reach the evacuation site directly. Furthermore, the brightness of the headlamps of the vehicles 2-1, 2-2, 2-3, 2-4 at the last left and the last right may be controlled to decrease. Furthermore, as shown in FIG. 8, the vehicle I stopped at the center may control the headlamp to an off state in order not to obstruct the view of the occupant evacuating to the rear.

According to various exemplary embodiments of the present invention, when the evacuation site is at the rear of the vehicle, the vehicle I may control the headlamp so that light of the headlamp is irradiated to the left of the vehicle when the vehicle is located in the first lane and so that the light of the headlamp is irradiated to the right of the vehicle when the vehicle is located in a last lane of the road.

Furthermore, when the evacuation site is at the rear of the vehicle, the headlamp may be controlled so that light from the headlamp is not irradiated when the vehicle location does not correspond to the first lane and the last lane of the road.

According to various exemplary embodiments of the present invention, the vehicle 1 may control the head lamp so that the light from the head lamp is irradiated to the front of the vehicle when the vehicle location is a tunnel and a degree of entry of the vehicle is longer than a remaining section of the tunnel, and may control the headlamp so that light from the headlamp is irradiated to the left or the right of the vehicle when the degree of entry of the vehicle is shorter than the remaining section.

FIG. 7 and FIG. 8 correspond to a vehicle control method performed when the vehicle 1 is relatively close to the entrance or exit in the tunnel. Meanwhile, inside the tunnel, there is an emergency exit to evacuate in a case of an emergency. When the entrance or exit is close inside the tunnel, it is preferable to evacuate to the entrance or exit, but this is not the case when the tunnel is long and an emergency situation occurs in the middle.

Figure 9:
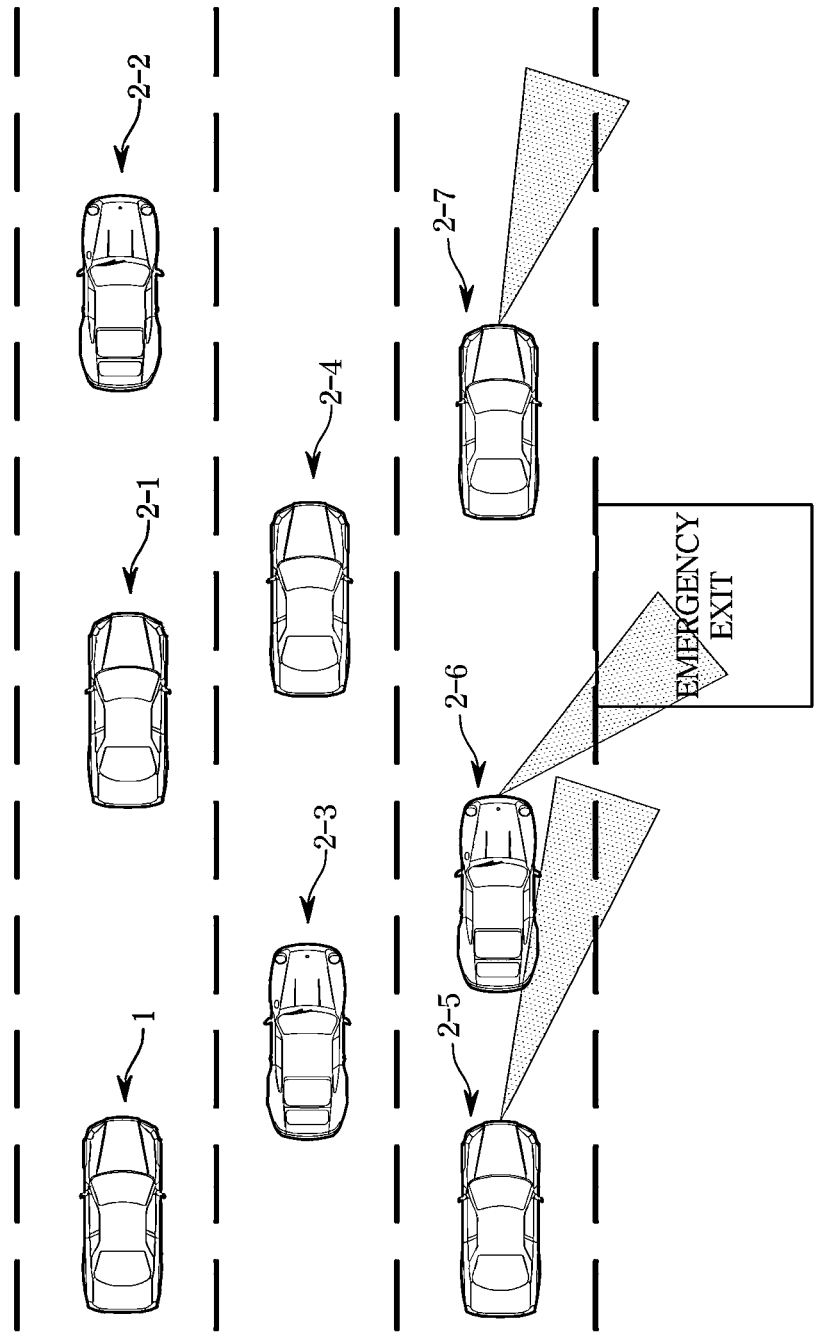
FIG. 9 shows an example of an emergency exit evacuation in an emergency situation. 9 shows an example of an emergency exit evacuation in an emergency situation.

FIG. 9 shows an example of an emergency exit evacuation in an emergency situation.

Referring to FIG. 9, the vehicle 1 receives the location information related to the emergency exit from the server 3, and is in a state in which location information is transmitted to an emergency exit to a plurality of other vehicles 2-1 to 2-7 through a server 3 or a communication of the vehicle 1.

At the instant time, the vehicle (1) may control transmit irradiation angle information so that the vehicles 2-5 to 2-7 adjacent to the emergency exit may irradiate the light of the headlamp toward the emergency exit to induce the occupant to escape the emergency exit.

Here, the irradiation angle information may be directly transmitted by the server 3 instead of the vehicle 1.

Vehicles 2-6, 2-7 in the rear of the emergency exit may control the headlamp so that light is irradiated toward the emergency exit, and Vehicles 2-5 in front of the emergency exit may control the headlamps so that light is irradiated to the tunnel wall.

Furthermore, vehicles 1, 2-1 to 2-4 that are not adjacent to the emergency exit may control the headlamp to an off state in order not to obstruct the view of the occupant evacuating toward the emergency exit.

According to various exemplary embodiments of the present invention, the vehicle 1 may control the server 3 to receive the position of the emergency exit of the tunnel and control the headlamp so that the light of the headlamp is directed toward the emergency exit.

Furthermore, the vehicle 1 may control the headlamp so that when the emergency exit is in front of the vehicle 1, the light of the headlamp is directed toward the position of the emergency exit, and may control the headlamp so that the light of the headlamp is directed toward a wall of the tunnel if the emergency exit is rear to the vehicle 1.

Figure 10:
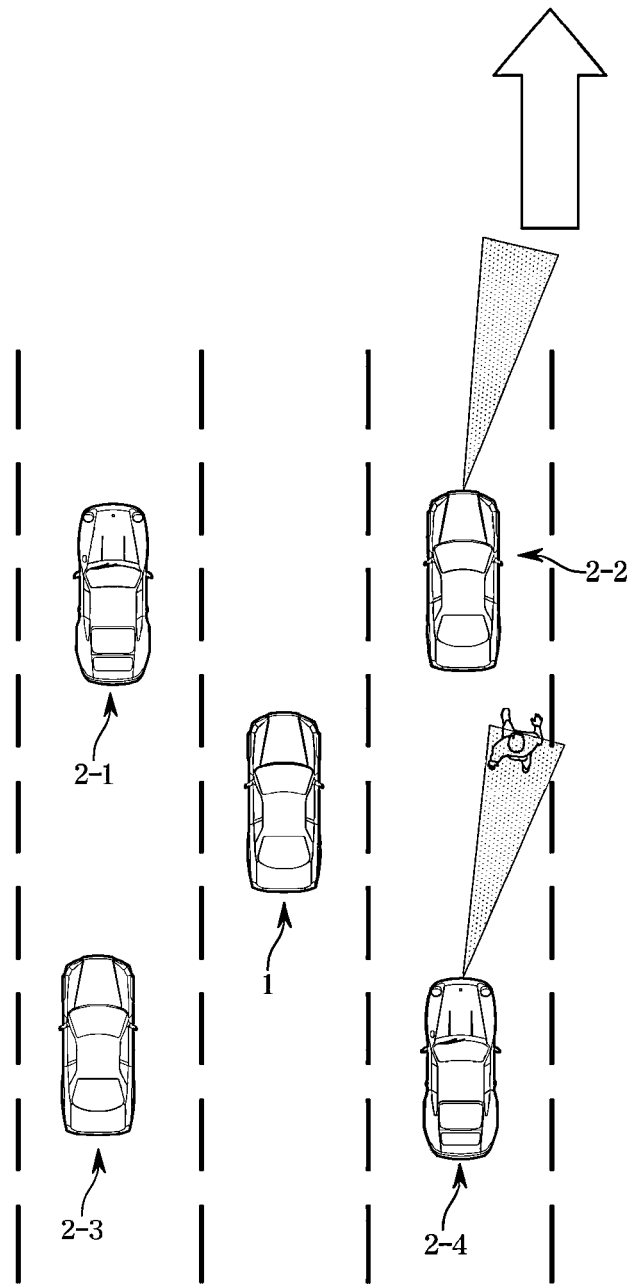
FIG. 10 shows a headlamp control for guiding an escape route in an emergency situation. 10 shows a headlamp control for guiding an escape route in an emergency situation.

FIG. 10 shows a headlamp control for guiding an escape route in an emergency situation.

Referring to FIG. 10, the vehicle 1 may transmit a control signal to control the irradiation angle of the headlamp of the vehicle 2-2 and 2-4 toward the evacuation site by obtaining an evacuation site from the server 3. At the instant time, when the vehicle 2-4 detects a passenger between the vehicle 2-2 and the vehicle 2-4, the irradiation angle of the headlamp toward the evacuation site may be controlled to face the rear of the occupant.

Accordingly, the occupant may secure both the view of the evacuation site and the view of the evacuation route. According to various exemplary embodiments of the present invention, when the vehicle 1 detects a passenger, the vehicle 1 may control the headlamp so that light is irradiated toward the rear of the occupant.

Meanwhile, the disclosed exemplary embodiments may be embodied in a form of a recording medium storing instructions executable by a computer. The instructions may be stored in a form of program code, and when executed by a processor, may generate a program module to perform the operations of the included exemplary embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
a headlamp for irradiating light to the front of the vehicle;
a speaker for providing voice guidance;
a communication for performing wireless communication with a server; and
a controller configured to control, when detecting an emergency situation, the communication to transmit location information of the vehicle to the server, receive information on the evacuation site in response to a request to the server for an evacuation site based on the location information, and control the speaker to provide voice guidance including information on the evacuation site.

2. The vehicle according to claim 1, wherein the controller is configured to control, receive first irradiation angle information of the headlamp corresponding to the evacuation site in response to a request to the server for an evacuation site based on the location information, and control the head lamp based on the first irradiation angle information.

3. The vehicle according to claim 1, wherein the controller is configured to control the communication so that the server transmits the evacuation site to a plurality of other vehicles in the vicinity of the vehicle and so that the server transmits second irradiation angle information of a plurality of other vehicles corresponding to the evacuation site to the plurality of other vehicles.

4. The vehicle according to claim 1, wherein the controller is configured to control the communication to receive location information of a plurality of other vehicles in the vicinity of the vehicle, generates second irradiation angle information of headlamps of the plurality of other vehicles based on the evacuation location and location information of the plurality of other vehicles, and transmit the second irradiation angle information to the plurality of other vehicles.

5. The vehicle according to claim 1, wherein the controller is configured to control the headlamp so that light from the headlamp is directed toward the evacuation site when the evacuation site is in front of the vehicle.

6. The vehicle according to claim 1, wherein when the vehicle is located in the first lane, the controller is configured to control the headlamp so that the light of the headlamp is irradiated to the left when the vehicle is located in the first lane, and so that when light of the headlamp is irradiated to the right the vehicle is located in the last lane.

7. The vehicle according to claim 6, wherein when the evacuation site is a rear of the vehicle, the controller is configured to control the headlamp so that light from the headlamp is not irradiated when the location of the vehicle does not correspond to the first lane and the last lane.

8. The vehicle according to claim 1, wherein the controller is configured to control the headlamp so that light from the headlamp is irradiated to the front of the vehicle when the location of the vehicle is a tunnel, and the degree of entry of the vehicle is longer than the remaining section, and control the headlamp so that the light of the headlamp is irradiated to the left or right when the degree of entry of the vehicle is shorter than the remaining section.

9. The vehicle according to claim 8, wherein the controller is configured to control to receive a position of an emergency exit of the tunnel from the server, and control the headlamp so that light from the headlamp is directed to the emergency exit.

10. The vehicle according to claim 9, wherein the controller is configured to control the headlamp so that the light of the headlamp is directed toward the position of the emergency exit when the emergency exit is in front of the vehicle, and control the headlamp so that the light from the headlamp is directed toward the wall of the tunnel when the emergency exit is behind the vehicle.

11. The vehicle according to claim 3, wherein the controller is configured to control the communication so that the server transmits the evacuation site to a plurality of other vehicles around the vehicle, and the capacity of the battery of the plurality of different vehicles is equal to or higher than a predetermined level.

* * * * *